(12) United States Patent
Jackson, Jr.

(10) Patent No.: US 9,128,998 B2
(45) Date of Patent: Sep. 8, 2015

(54) PRESENTATION OF DATA OBJECT HIERARCHIES

(76) Inventor: Robert Lewis Jackson, Jr., Beitar Illit (IL)

(*) Notice: Subject to any disclaimer, the term of this patent is extended or adjusted under 35 U.S.C. 154(b) by 0 days.

(21) Appl. No.: 13/226,270

(22) Filed: Sep. 6, 2011

(65) Prior Publication Data

US 2012/0059857 A1      Mar. 8, 2012

Related U.S. Application Data

(60) Provisional application No. 61/380,060, filed on Sep. 3, 2010.

(51) Int. Cl.
G06F 7/00       (2006.01)
G06F 17/30      (2006.01)

(52) U.S. Cl.
CPC .... G06F 17/30589 (2013.01); G06F 17/30327 (2013.01); G06F 17/30572 (2013.01)

(58) Field of Classification Search
CPC ............... G06F 17/30327; G06F 17/30589; G06F 17/30572
USPC ........................................................... 707/797
See application file for complete search history.

(56) References Cited

U.S. PATENT DOCUMENTS

| | | | |
|---|---|---|---|
| 5,749,079 | A | 5/1998 | Yong et al. |
| 6,105,018 | A | 8/2000 | Demers et al. |
| 6,175,836 | B1 | 1/2001 | Aldred |
| 6,377,287 | B1 | 4/2002 | Hao et al. |
| 6,567,802 | B1 | 5/2003 | Popa et al. |
| 6,763,361 | B1 | 7/2004 | Poskanzer |
| 6,772,180 | B1 | 8/2004 | Li et al. |
| 6,801,905 | B2 | 10/2004 | Andrei |
| 7,103,600 | B2 | 9/2006 | Mullins |
| 7,366,723 | B2 | 4/2008 | Shaburov |
| 8,051,105 | B1 | 11/2011 | Johnson |
| 8,392,467 | B1 | 3/2013 | Johnson |
| 8,401,292 | B2 | 3/2013 | Park et al. |
| 8,832,111 | B2 | 9/2014 | Venkataramani et al. |
| 8,978,010 | B1 | 3/2015 | Thumfart et al. |

(Continued)

OTHER PUBLICATIONS

"Using Hibernate in a Java Swing Application," product tutorial retrieved from website http://netbeans.org/kb/docs/java/hibernate-java-se.html (12 pgs).
"View (database)," retrieved from Wikipedia at http://en.wikipedia.org/wili/View_(database) (3 pgs).
"Welcome to the dbViz, Database Visualizer project!" retrieved from website http://jdbv.sourceforge.net/dbViz/.
T. Sentissi, E. Pichat, "A graphical user interface for object-oriented database," sccc, pp. 227, 17th International Conference of the Chilean Computer Science Society (SCCC '97), 1997.

(Continued)

*Primary Examiner* — Usmaan Saeed
*Assistant Examiner* — Paul Kim
(74) *Attorney, Agent, or Firm* — Edward J. Radlo; Radlo IP Law Group

(57) ABSTRACT

Systems and methods for use in presenting a hierarchy of data objects. Data objects in a hierarchy are each associated with a node type of a plurality of node types. A graphical representation of the hierarchy is created. The graphical representation includes including a plurality of strata corresponding to the plurality of node types. A plurality of tree nodes representing the data objects is created. Each tree node is associated with the node type that corresponds to the associated data object. The tree nodes associated with the node type that corresponds to the stratum are included in each stratum of the plurality of strata. The graphical representation may include hierarchical connectors extending between the tree nodes and representing hierarchical relationships between the data objects represented by the tree nodes.

2 Claims, 14 Drawing Sheets

(56) References Cited

U.S. PATENT DOCUMENTS

| | | |
|---|---|---|
| 8,983,898 B1 | 3/2015 | Alfonseca et al. |
| 2003/0065527 A1 | 4/2003 | Yeh et al. |
| 2003/0115545 A1 | 6/2003 | Hull et al. |
| 2004/0181554 A1 | 9/2004 | Heckerman et al. |
| 2004/0215649 A1* | 10/2004 | Whalen et al. ............... 707/102 |
| 2004/0249809 A1 | 12/2004 | Ramani et al. |
| 2005/0251371 A1 | 11/2005 | Chagoly et al. |
| 2006/0015588 A1 | 1/2006 | Achlioptas et al. |
| 2006/0253476 A1 | 11/2006 | Roth et al. |
| 2007/0180408 A1* | 8/2007 | Rusu et al. ............... 715/855 |
| 2008/0056572 A1 | 3/2008 | Nielsen |
| 2008/0294641 A1 | 11/2008 | Kim |
| 2009/0080853 A1 | 3/2009 | Chen et al. |
| 2009/0094217 A1 | 4/2009 | Dettinger et al. |
| 2009/0175543 A1 | 7/2009 | Nielsen |
| 2009/0182837 A1 | 7/2009 | Rogers |
| 2009/0296568 A1 | 12/2009 | Kitada |
| 2010/0214313 A1 | 8/2010 | Herman et al. |
| 2011/0270606 A1 | 11/2011 | Crochet et al. |
| 2012/0229466 A1 | 9/2012 | Riche et al. |
| 2013/0174129 A1 | 7/2013 | Grammel et al. |
| 2013/0325864 A1 | 12/2013 | Sarshar et al. |
| 2014/0304214 A1 | 10/2014 | Sakunkoo et al. |

OTHER PUBLICATIONS

P. Sawyer, I. Sommerville, "User interface tools for object-oriented database systems," IEE Colloquium on Software Tools for Interface Design, Nov. 8, 1990, pp. 9/1-9/4, London.

International Search Report and Opinion for co-pending PCT patent application No. PCT/US2011/050567.

International Preliminary Report on Patentability (PCT/IB/373) and a Written Opinion of the International Searching Authority (PCT/ISA/237) dated Mar. 14, 2013 for co-pending International Application No. PCT/US2011/050567 (7 pgs).

Kennedy, J. and Barclay, P. (Eds). "Interfaces to Databases (IDS-3)", Proceedings of the 3rd International Workshop on Interfaces to Databases, Napier University, Edinburgh, Scotland, Jul. 8-10, 1996, 12 pgs.

"Graph Rewrite Systems for Program Optimization", Uwe Assmann, Transactions on Programming Languages and Systems, vol. 22 No. 4, published Jul. 2010, U.S.A.

"Graph-based KNN Text Classification" Zonghu Wang and Zhijing Liu, Seventh International Conference on Fuzzy Systems and Knowledge Discovery (FSKD 2010). pp. 2363-2366, published by IEEE in 2010, U.S.A.

* cited by examiner

PRESENTATION OF DATA OBJECT HIERARCHIES

CROSS-REFERENCE TO RELATED APPLICATIONS

This application claims the benefit of U.S. Provisional Application No. 61/380,060, filed 3 Sep. 2010, which is hereby incorporated by reference in its entirety.

BACKGROUND OF THE INVENTION

The subject matter disclosed herein relates generally to data presentation and, more specifically, to systems and methods for use in presenting stratified trees that include nodes from a hierarchy of data objects in stratified areas.

At least some known software applications present data objects as nodes in a tree structure that represents a hierarchical relationship between the data objects. Notably, such a presentation technique provides a user with only one perspective that is based on the object hierarchy. Known software applications do not group tree nodes by type, such that both hierarchical relationships and type relationships are presented. Rather, hierarchical relationships and type relationships are generally conveyed by separate presentations.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method for presenting a hierarchy of data objects is provided. The method includes determining for each data object in the hierarchy, by a computing device, an associated node type to create a plurality of node types. The computing device creates a graphical representation of the hierarchy including a plurality of strata corresponding to the plurality of node types, and also creates a plurality of tree nodes representing the data objects. Each tree node is associated with the node type that corresponds to the associated data object. The computing device further includes in each stratum of the plurality of strata the tree nodes associated with the node type that corresponds to the stratum and provides the graphical representation of the hierarchy for presentation to a user.

In another aspect, a device including a memory for storing a hierarchy of data objects and a processor coupled to the memory is provided. Each data object is associated with a node type of a plurality of node types. The processor is programmed to create a graphical representation of the hierarchy including a plurality of strata corresponding to the plurality of node types, and to create a plurality of tree nodes representing the data objects. Each tree node associated with the node type that corresponds to the associated data object. The processor is also programmed to include in each stratum of the plurality of strata the tree nodes associated with the node type that corresponds to the stratum, and to include in the graphical representation hierarchical connectors extending between the tree nodes. The hierarchical connectors represent hierarchical relationships between the data objects represented by the tree nodes.

In yet another aspect, one or more non-transitory computer-readable media having computer-executable instructions embodied thereon are provided. When executed by at least one processor, the computer-executable instructions cause the processor to: determine a node type that is associated with each data object in a hierarchy of data objects to create a plurality of node types; to create a graphical representation of the hierarchy including a plurality of strata corresponding to the plurality of node types; to create a plurality of tree nodes representing the data objects, each tree node associated with the node type that corresponds to the associated data object; to include in each stratum of the plurality of strata, by the computing device, the tree nodes associated with the node type that corresponds to the stratum; and to include in the graphical representation hierarchical connectors extending between the tree nodes. The hierarchical connectors represent hierarchical relationships between the data objects represented by the tree nodes.

BRIEF DESCRIPTION OF THE DRAWINGS

The embodiments described herein may be better understood by referring to the following description in conjunction with the accompanying drawings.

DETAILED DESCRIPTION OF THE INVENTION

The embodiments described herein enable the presentation of data objects based on both hierarchical and type (e.g., attribute-related) relationships. In exemplary embodiments, tree nodes representing the data objects are positioned in strata based on node types associated with the tree nodes, and hierarchical connectors extend between tree nodes, indicating hierarchical relationships between the represented data objects. Node types may be determined based on a user-selectable classification strategy, such as grouping by a particular aspect and/or attribute of the data objects.

An exemplary technical effect of the methods, systems, and apparatus described herein includes at least one of (a) determining for each data object in the hierarchy, by a computing device, an associated node type to create a plurality of node types; (b) creating, by the computing device, a graphical representation of the hierarchy including a plurality of strata corresponding to the plurality of node types; (c) creating, by the computing device, a plurality of tree nodes representing the data objects, each tree node associated with the node type that corresponds to the associated data object; (d) including in each stratum of the plurality of strata, by the computing device, the tree nodes associated with the node type that corresponds to the stratum; (e) including in the graphical representation hierarchical connectors extending between the tree nodes, wherein the hierarchical connectors represent hierarchical relationships between the data objects represented by the tree nodes; and (f) providing the graphical representation of the hierarchy for presentation to a user.

Figure 1:
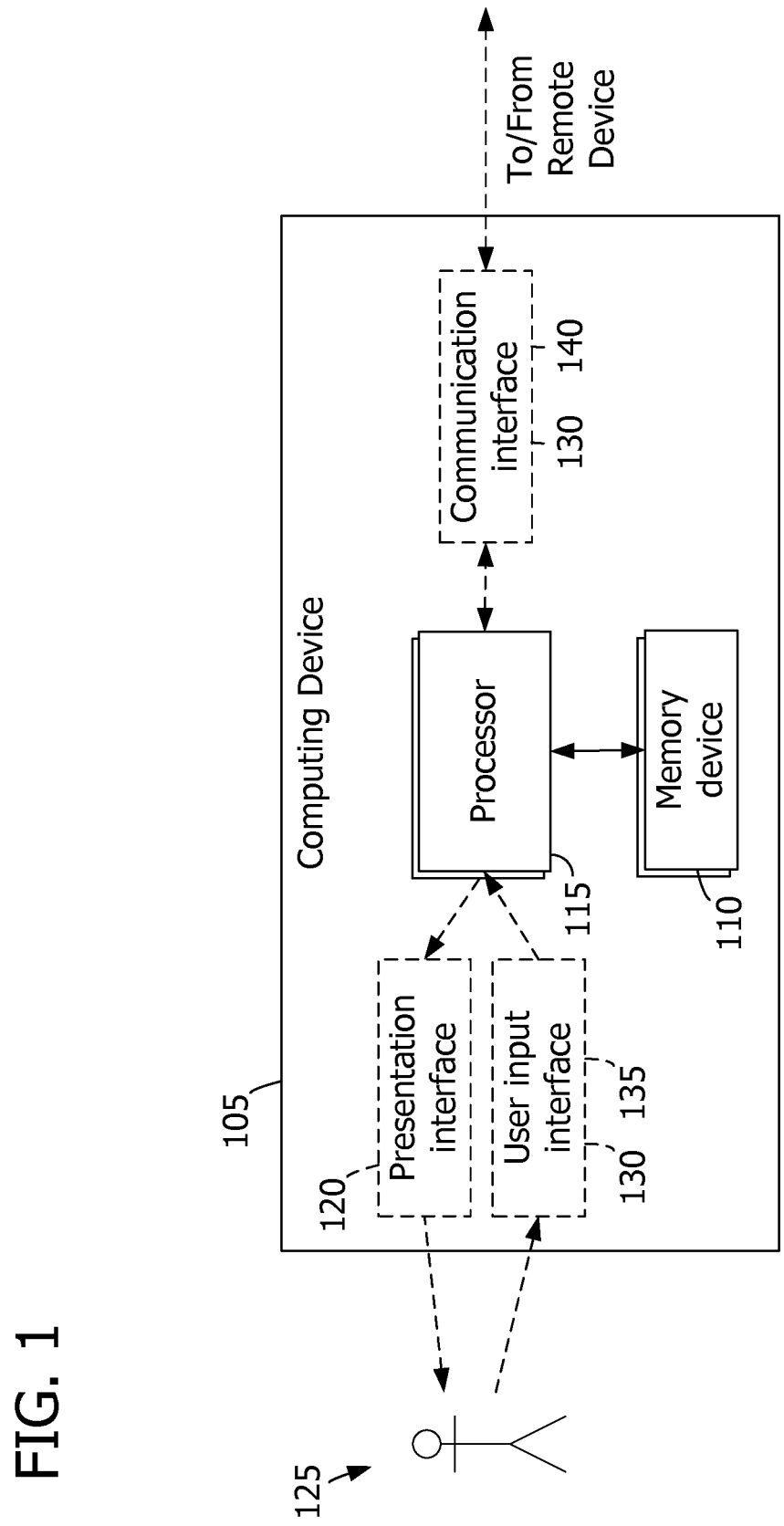
FIG. 1 is a block diagram of an exemplary computing device.

FIG. 1 is a block diagram of an exemplary computing device 105. Computing device 105 includes a memory device 110 and a processor 115 coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. Processor 115 may include one or more processing units (e.g., in a multi-core configuration).

Memory device 110 is one or more devices that enable information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, a hierarchy of data objects, node types, available classification strategies, computer-executable instructions, and/or any other type of data.

In some embodiments, computing device 105 includes a presentation interface 120 that is coupled to processor 115. Presentation interface 120 presents information, such as data objects and/or classification strategies, to a user 125. For example, presentation interface 120 may include a display adapter (not shown in FIG. 1) that may be coupled to a display device, such as a cathode ray tube (CRT), a liquid crystal display (LCD), an organic LED (OLED) display, and/or an "electronic ink" display. In some embodiments, presentation interface 120 includes one or more display devices. In addition to, or in the alternative, presentation interface 120 may include an audio output device (e.g., an audio adapter and/or a speaker) and/or a printer.

In some embodiments, computing device 105 includes an input interface 130, such as a user input interface 135 or a communication interface 140. Input interface 130 may be configured to receive any information suitable for use with the methods described herein.

In exemplary embodiments, user input interface 135 is coupled to processor 115 and receives input from user 125. User input interface 135 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone). A single component, such as a touch screen, may function as both a display device of presentation interface 120 and user input interface 135.

Communication interface 140 is coupled to processor 115 and is configured to be coupled in communication with one or more remote devices, such as another computing device 105. For example, communication interface 140 may include, without limitation, a wired network adapter, a wireless network adapter, and/or a mobile telecommunications adapter. Communication interface 140 may also transmit data to one or more remote devices. For example, a communication interface 140 of one computing device 105 may transmit an indication of one or more source code portions of interest and/or one or more execution events to the communication interface 140 of another computing device 105.

Figure 2:
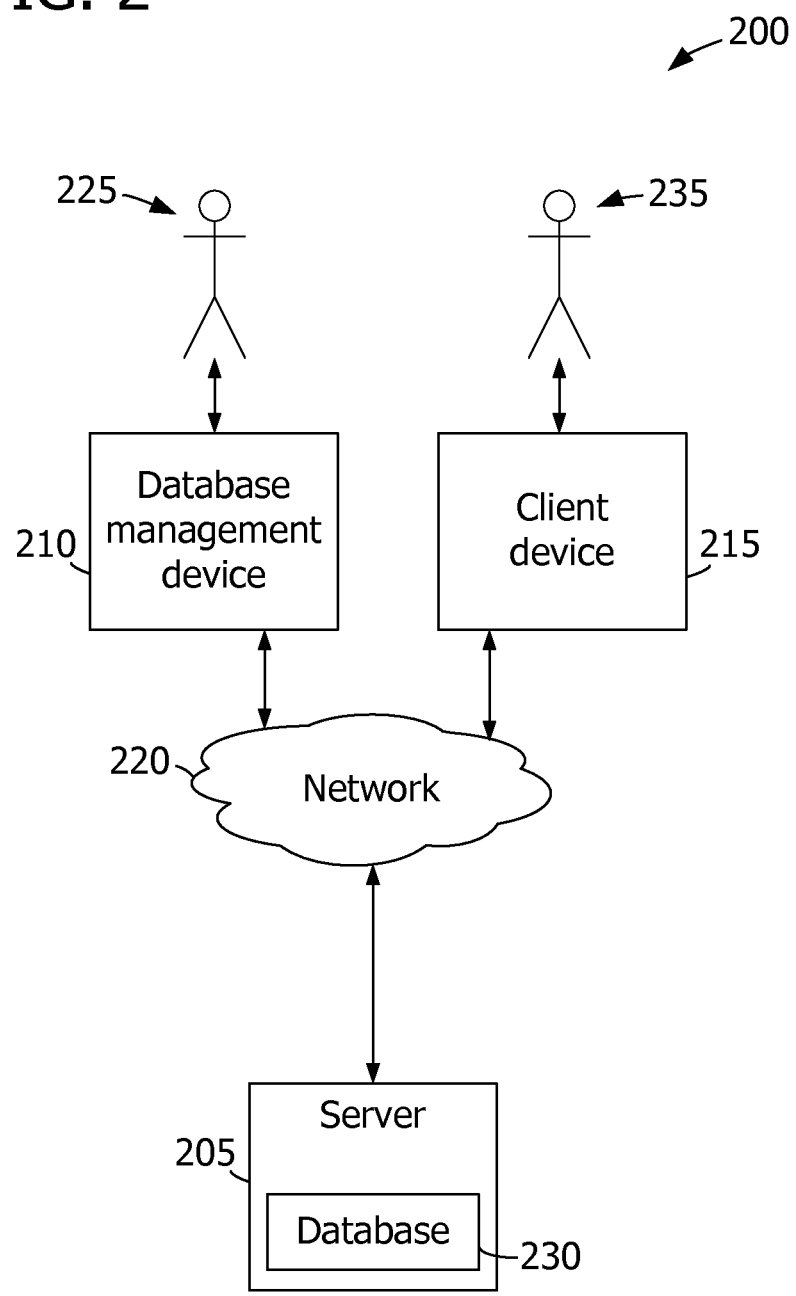
FIG. 2 is block diagram of an exemplary computing system that includes a server, a database management device, and a client device.

FIG. 2 is block diagram of an exemplary system 200 including a server 205, a database management device 210, and a client device 215 coupled in communication via a network 220. Network 220 may include, without limitation, the Internet, a local area network (LAN), a wide area network (WAN), a wireless LAN (WLAN), a mesh network, and/or a virtual private network (VPN). While certain operations are described below with respect to particular computing devices 105, it is contemplated that any computing device 105 may perform any portion or the entirety of the described operations.

In exemplary embodiments, server 205, database management device 210, and client device 215 are computing devices 105 (shown in FIG. 1). Each computing device 105 is coupled to network 220 via a communication interface 140 (shown in FIG. 1). In an alternative embodiment, server 205 is integrated with database management device 210 and/or with client device 215.

Server 205 stores data that is accessible by client device 215. In some embodiments, server 205 executes a database 230 that stores data in a structured format, such as tables with a plurality of columns and rows. In such embodiments, server 205 receives and responds to requests from database management device 210 and client device 215, as described in more detail below. In addition, or alternatively, server 205 may provide data to client device 215 from a source other than database 230. For example, server 205 may transmit files stored at server 205 or some other device to client device 215. As another example, server 205 may execute a software application, such as a web service, that provides data to client device 215.

Database management device 210 interacts with a database administrator 225 (e.g., via user input interface 135 and/or presentation interface 120). For example, database management device 210 may be configured to receive database schema data, such as definitions of tables and/or columns in a relational database, from database administrator 225. Database management device 210 transmits the schema data to server 205 via network 220. Server 205 receives and applies the schema data to database 230.

Client device 215 interacts with a user 235 (e.g., via user input interface 135 and/or presentation interface 120). For example, client device 215 may acquire and/or receive data objects provided by database 230 (e.g., product data, media data, education data, and/or any other type of data) and present such data to, user 235. For example, client device 215 may present data in stratified trees, as described in more detail below. Further, client device 215 may receive data from user 235 and submit the data to server 205, such that database 230 is updated with the submitted data.

In some embodiments, client device 215 is remote to server 205. For example, client device 215 may be located at a facility that is geographically removed from server 205 and/or database management device 210. Further, although client device 215 is described above as receiving data from server 205 and presenting the received data to user 235, in some embodiments, client device 215 presents data that is stored at client device 215. For example, client device 215 may execute database 230 and/or access data stored in one or more files at client device 215.

Figure 3:
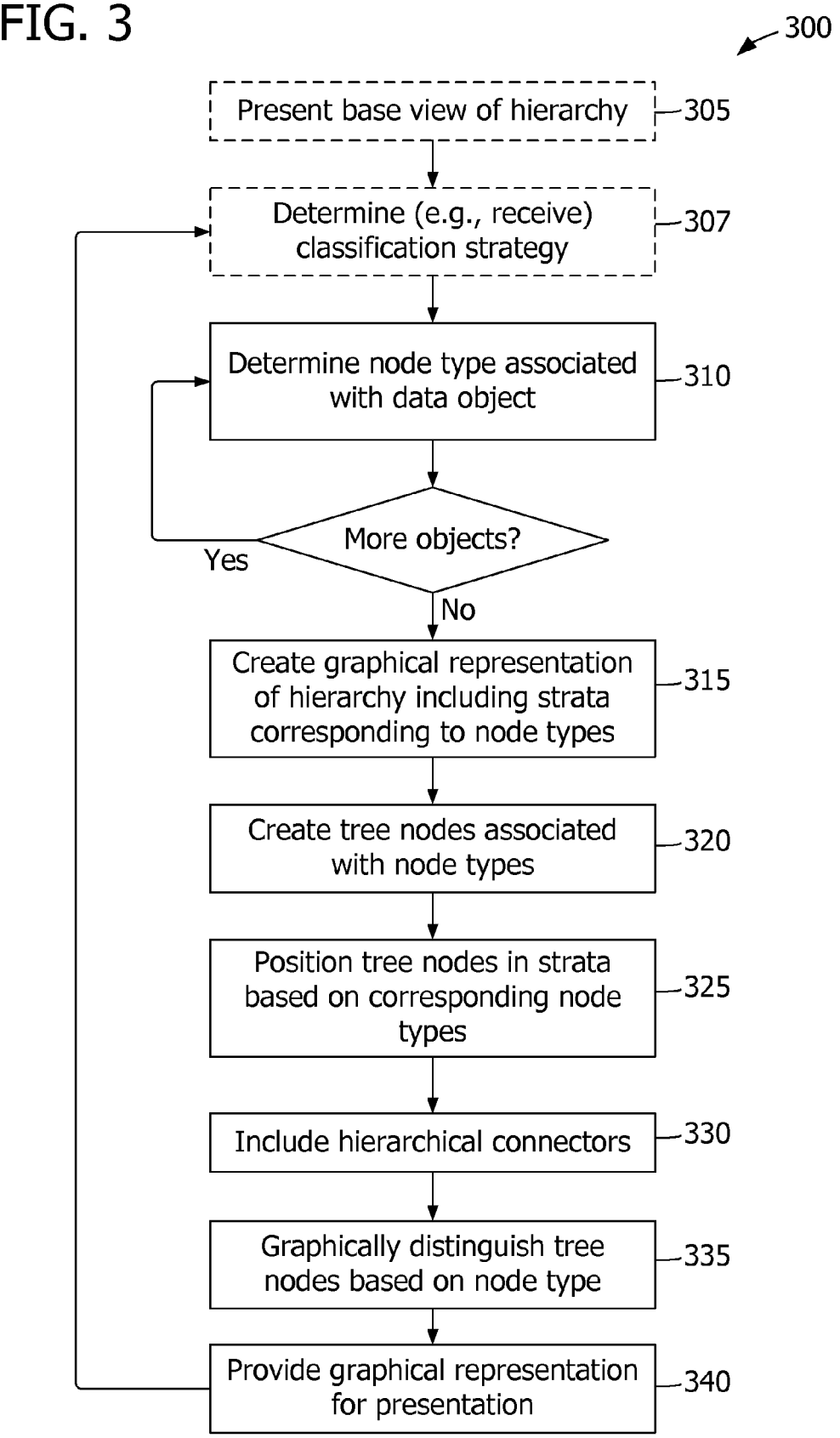
FIG. 3 is a flowchart of an exemplary method for use in presenting a hierarchy of data objects.

FIG. 3 is a flowchart of an exemplary method 300 for use in presenting a hierarchy of data objects. Portions of method 300 may be performed, for example, using any one of or any combination of computing devices 105 in system 200 (shown in FIG. 2).

Figure 4:
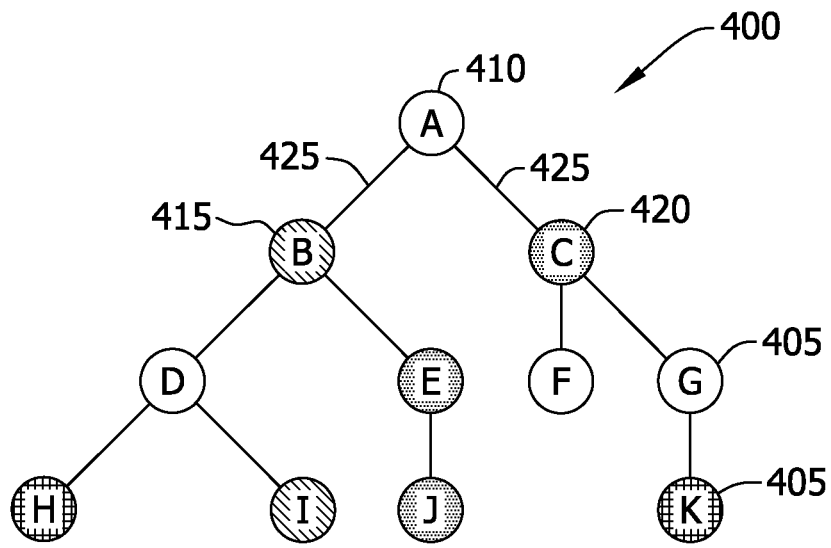
FIG. 4 is an exemplary user interface for presenting a base view of a hierarchy of data objects.

In some embodiments, a computing device 105 provides 305 a base view of a hierarchy of data objects for presentation to a user. FIG. 4 is an exemplary user interface 400 for presenting a base view of a hierarchy of data objects. User interface 400 is provided herein to illustrate the hierarchy shown in FIGS. 5-8 and is optionally provided 305 for presentation to a user. In some embodiments, user interface 400 is not provided 305 by computing device 105.

User interface 400 includes a plurality of tree nodes 405, each of which represents a data object in the hierarchy. For example, the hierarchy may include media (e.g., books and/or videos), education courses in a course catalog, personnel in a chain of command, and/or any other hierarchically organized data objects.

Each tree node 405 is associated with zero or one "parent" nodes representing data objects above the tree node 405 in the hierarchy, and zero or more "child" nodes representing data objects below the tree node 405 in the hierarchy. In exemplary embodiments, the positions of tree nodes in user interface 400 correspond to the positions of the represented data objects in the hierarchy. For example, the root object of the hierarchy, which has no parents and is considered to be at the top of the hierarchy, is represented by a root node 410 positioned above all other tree nodes 405. Alternatively, instead of being presented as the top-most tree node 405, root node 410 may be presented as the left-most tree node 405 or at any extreme of user interface 400.

The root object is associated with two child objects, represented by a first child node 415 and a second child node 420, which are positioned below root node 410. Hierarchical connectors 425 extend from root node 410 to first child node 415 and to second child node 420. Similarly, data objects below first child node 415 and second child node 420 in the hierarchy are represented by tree nodes 405 positioned below first child node 415 and second child node 420 in user interface 400.

Computing device 105 determines 310 for each data object in the hierarchy an associated node type to create a plurality of node types. For example, academic media may be classified into types of media format, such as software, video, tapes, and books, as described in more detail below with reference to FIG. 10.

Figure 5:
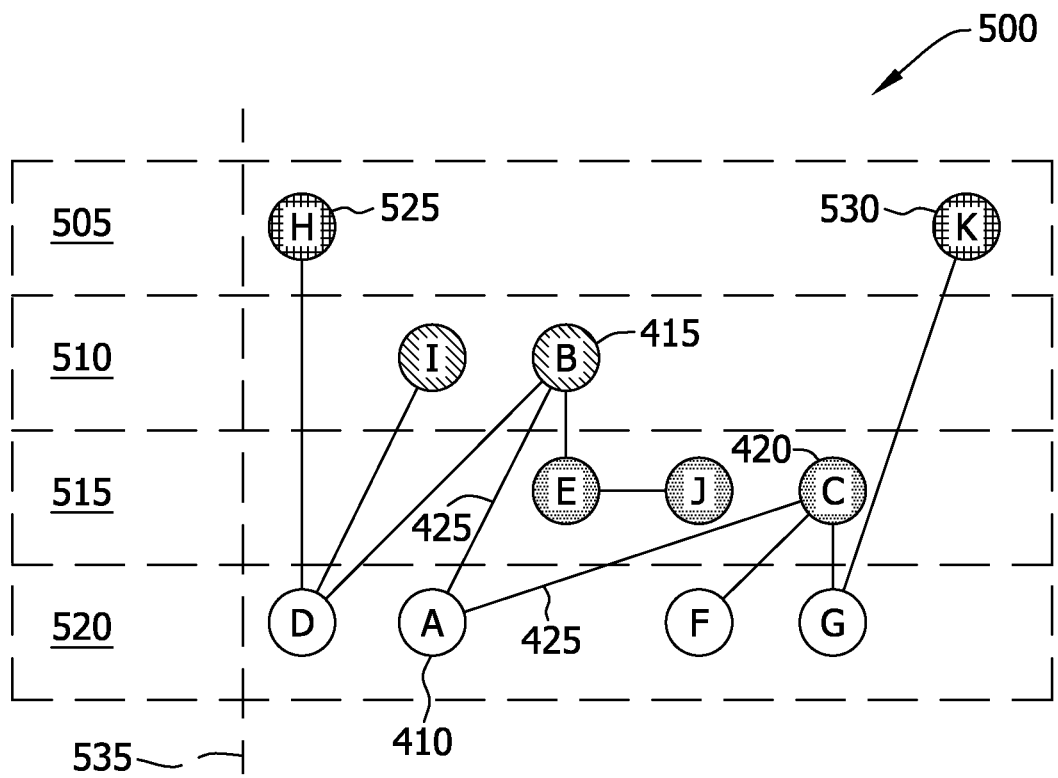
FIG. 5 is an exemplary user interface for presenting a graphical representation of a hierarchy of data objects.

Computing device 105 creates 315 a graphical representation of the hierarchy including a plurality of strata corresponding to the plurality of node types. FIG. 5 is an exemplary user interface 500 for presenting a graphical representation of a hierarchy of data objects. User interface 500 includes a first stratum 505 corresponding to a first node type, a second stratum 510 corresponding to a second node type, a third stratum 515 corresponding to a third node type, and a fourth stratum 520 corresponding to a fourth node type.

Computing device 105 creates 320 a plurality of tree nodes representing the existing data objects in the hierarchy. Each tree node is associated with the node type that corresponds to the associated data object. Computing device 105 positions 325 in each stratum of the plurality of strata the tree nodes associated with the node type that corresponds to the stratum. As shown in FIG. 5, for example, a first node 525 and a second node 530 are included 325 in first stratum 505.

Accordingly, user interface 500 facilitates presenting the groupings of tree nodes into regions (e.g., strata) by node type, thereby allowing a user to see all of a specific type of node easily. In one embodiment, tree nodes are positioned within user interface 500 by traversing the hierarchy of data objects depth-first (e.g., by beginning at a deepest level of the hierarchy), placing tree nodes representing the data objects into strata of user interface 500 while progressing in a predetermined direction (e.g., left to right) in the hierarchy presented in user interface 400 (shown in FIG. 4). The horizontal positioning of any node may be adjusted in a predetermined direction (e.g., to the right) to an extent that allows the node itself and any hierarchical connector(s) to be drawn without overlapping any other nodes or hierarchical connectors already drawn. All nodes of each type may be clearly distinguished by placement in discrete strata and optionally graphically distinguished by node type (as described in more detail below), providing the effect of a set of lists.

In some embodiments, tree nodes in user interface 500 are graphically distinguished by node type. Graphical distinction may be accomplished using a background pattern, a background color, a line weight, a line color, an icon, an animation, and/or any other method of visually differentiating user interface elements from one another. For example, tree nodes associated with a first node type and positioned in first stratum 505 may be presented with a first background pattern, with a first line pattern, and/or in a first color, whereas tree nodes associated with a second node type and positioned in second stratum 510 may be presented with a second background pattern, with a second line pattern, and/or in a second color. As shown in FIGS. 4-8, tree nodes are graphically distinguished by node type using a background pattern that is unique to each node type.

In addition to presenting tree nodes by node type, computing device 105 also presents the hierarchical relationships between data objects. For example, computing device 105 may include 330 in user interface 500 hierarchical connectors 425, as described above with reference to FIG. 4. Hierarchical connectors 425 extend between tree nodes and represent hierarchical relationships between the data objects represented by the tree nodes.

As shown in FIG. 5, root node 410 corresponds to the fourth node type and is positioned in fourth stratum 520; first child node 415 corresponds to the second node type and is positioned in second stratum 510; and second child node 420 corresponds to the third node type and is positioned in third stratum 515. Further, computing device 105 includes in user interface 500 hierarchical connectors 425 extending between root node 410 and first child node 415, and between root node 410 and second child node 420.

In exemplary embodiments, computing device 105 emphasizes the different strata by graphically distinguishing 335 tree nodes based on the node types associated with the tree nodes. For example, visually distinct styles may be applied to the tree nodes of each stratum. As shown in FIG. 5, tree nodes in first stratum 505 are drawn with a first background pattern, tree nodes in second stratum 510 are drawn with a second background pattern, tree nodes in third stratum 515 are drawn with a third background pattern, and tree nodes in fourth stratum 520 are drawn with a fourth background pattern.

Computing device 105 provides 340 the graphical representation of the hierarchy for presentation to a user. For example, computing device 105 may directly present a graphical representation such as user interface 500 via a presentation interface 120 (shown in FIG. 1) and/or may transmit the graphical representation via a communication interface 140 (shown in FIG. 1) to another computing device 105 for presentation.

Various options are available positioning tree nodes within a graphical representation such as user interface 500. In some embodiments, hierarchical connectors 425 are drawn as straight lines, which may overlap and/or be graphically distinguished from each other. In other embodiments, hierarchical connectors 425 are drawn as curved and/or angled lines, such that overlapping of hierarchical connectors 425 may be avoided, and/or the graphical representation of the data object hierarchy may occupy a smaller area.

In the embodiment shown in FIG. 5, computing device 105 includes in user interface 500 a boundary 535, which may or may not be visible, perpendicular to the strata. Computing device 105 determines a target position associated with each tree node in user interface 500 and positions each tree node at the target position. The target position includes a distance from boundary 535 at which hierarchical connectors 425 extending from the tree node will not intersect any tree node that is not directly related to the tree node (e.g., any tree node other than a direct parent and/or direct child of the tree node) and will not intersect another hierarchical connector 425. For example, the distance may be determined as the smallest distance from boundary 535 at which such intersections will not occur. Optionally, the distance may be determined as a distance at which hierarchical connectors 425 extending from the tree node also will not pass within a predetermined distance (e.g., a "padding" distance) of other tree nodes and/or other hierarchical connectors 425.

In the embodiment shown in FIG. 5, all nodes are positioned as far left as possible without allowing tree nodes and/or hierarchical connectors 425 to intersect other tree nodes or hierarchical connectors at the time of positioning, given straight line hierarchical connectors 425. Such an embodiment facilitates presenting tree nodes within a stratum as a list, despite the presence of hierarchical connectors 425 extending from the tree nodes within the stratum.

In some embodiments, each tree node is positioned between (e.g., centered between) the minimum and maximum positions of all of its children. Such embodiments facilitate emphasizing the sub-trees of data objects within the hierarchy and may be valuable in contexts in which conveying such sub-tree relationships is desired.

Figure 6:
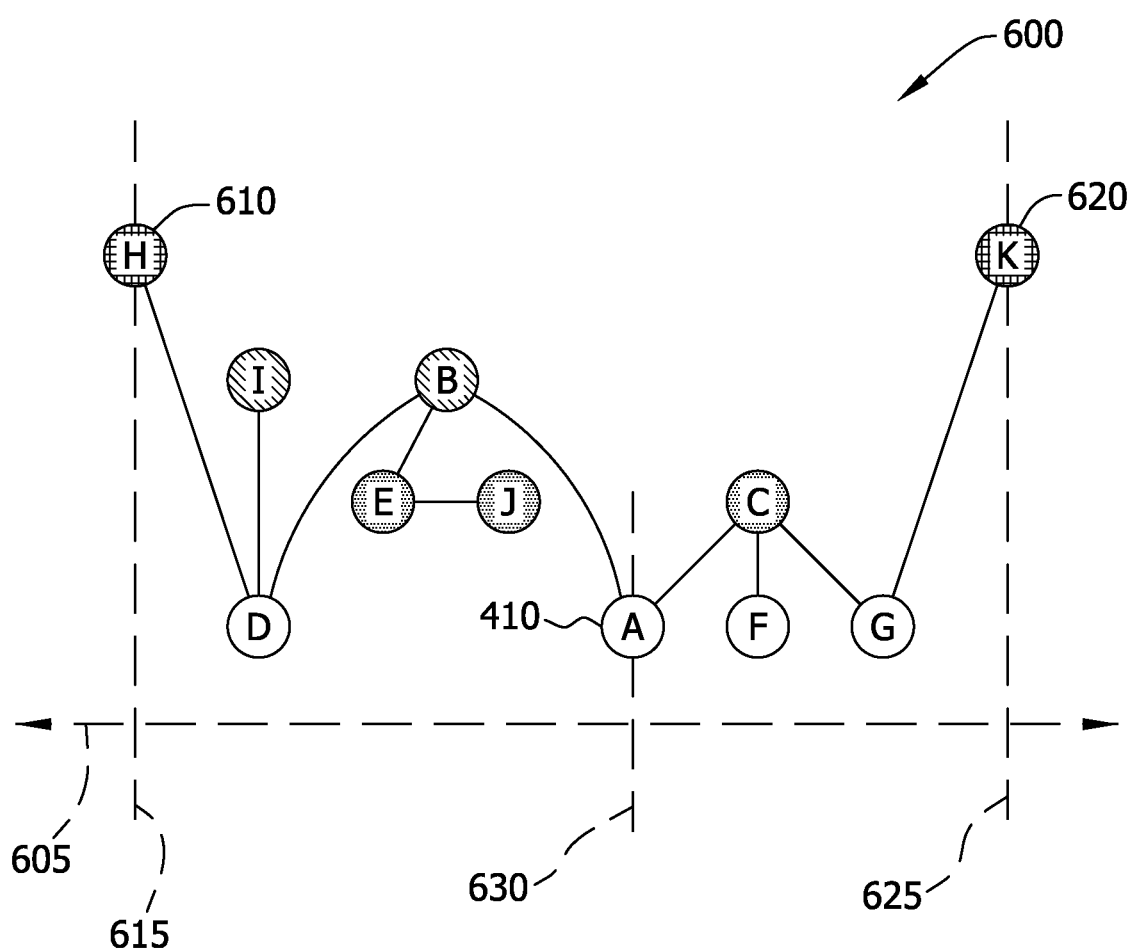
FIG. 6 is an exemplary user interface for presenting a graphical representation of a hierarchy of data objects in which tree nodes are positioned between child tree nodes.

FIG. 6 is an exemplary user interface 600 for presenting a graphical representation of a hierarchy of data objects in which tree nodes are positioned between child tree nodes. In user interface 600, the strata extend along an axis 605. Computing device 105 determines a minimum child position and a maximum child position associated with each tree node. The minimum child position represents a minimum position on axis 605 at which a child tree node of the tree node is positioned. The maximum child position represents a maximum position on axis 605 at which a child tree node of the tree node is positioned. For example, for root node 410, a left-most child node 610 is associated with a minimum child position 615 on axis 605, and a right-most child node 620 is associated with a maximum child position 625 on axis 605.

Computing device 105 determines a target position associated with each tree node between the minimum child position and the maximum child position associated with the tree node, and positions each tree node at the associated target position. In the example shown in FIG. 6, root node 410 is positioned at a target position 630 on axis 605 that is between minimum child position 615 and maximum child position 625. More specifically, target position 630 may be centered between (e.g., equidistant from) minimum child position 615 and maximum child position 625 associated with root node 410.

Figure 7:
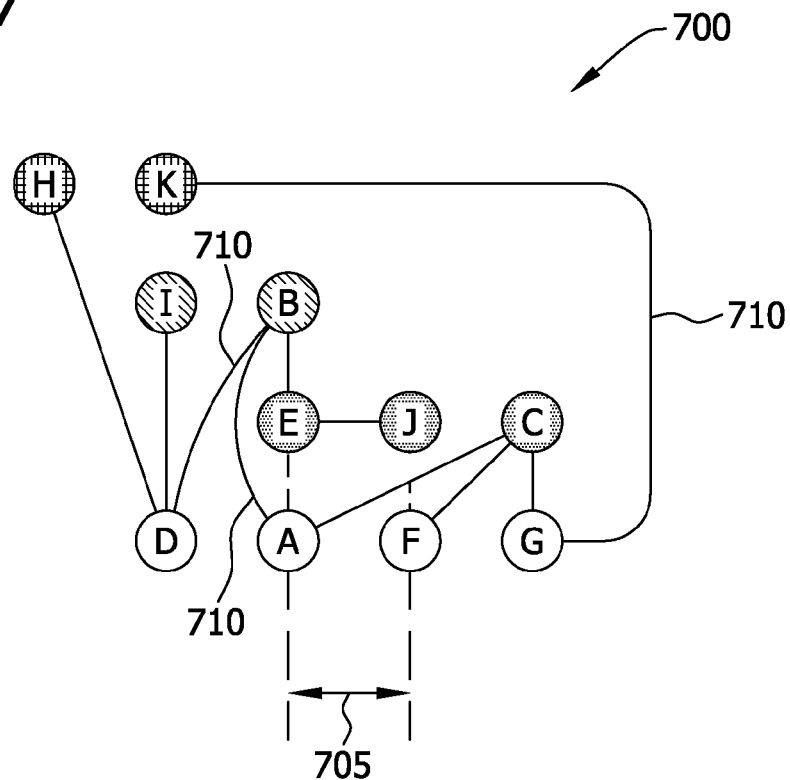
FIG. 7 is an exemplary user interface for presenting a graphical representation of a hierarchy of data objects with evenly spaced tree nodes in each stratum.

In some embodiments, tree nodes are evenly spaced within each stratum. FIG. 7 is an exemplary user interface 700 for presenting a graphical representation of a hierarchy of data objects with evenly spaced tree nodes in each stratum. In user interface 700, tree nodes within each stratum are spaced from each other at a predetermined distance 705. To accommodate the positioning of tree nodes based on predetermined distance 705, user interface 700 includes curved hierarchical connectors 710 that are shaped to avoid intersecting tree nodes that are not directly related to each tree node and to avoid intersecting other hierarchical connectors.

Figure 8:
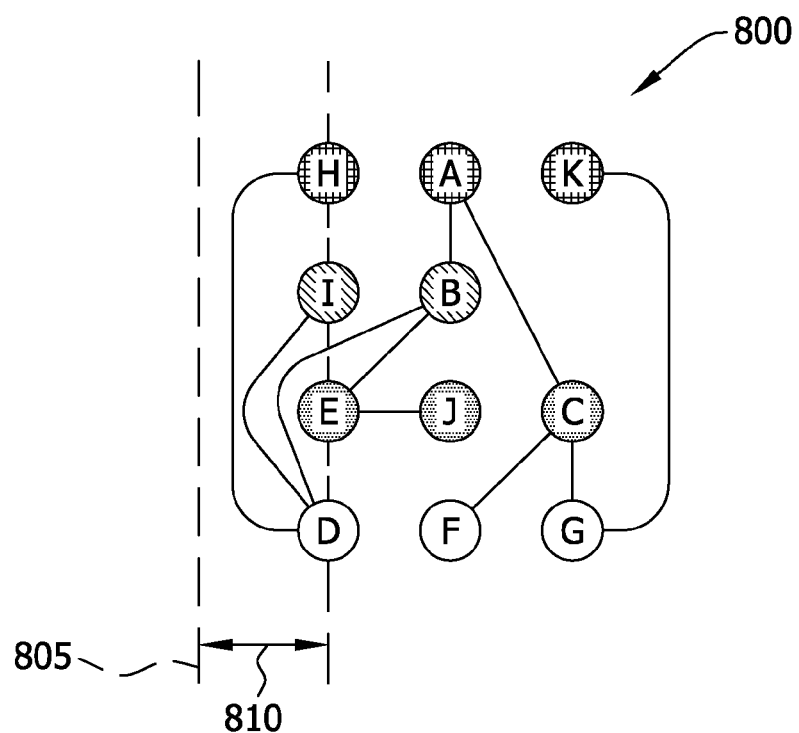
FIG. 8 is an exemplary user interface for presenting a graphical representation of a hierarchy of data objects as a grid tree.

FIG. 8 is an exemplary user interface 800 for presenting a graphical representation of a hierarchy of data objects in an arrangement that may be referred to as a "grid tree." User interface 800 includes a boundary 805 that is perpendicular to the strata. Computing device positions the set of tree nodes within each stratum at a predetermined distance 810 from boundary 805. Presenting the hierarchy as a grid tree, as shown in FIG. 8, may be useful in contexts that call for multiple lists, with the expectation that the underlying tree may be provided for occasional reference. For example, a vendor's site may display products by category, company, etc. The location of each product in a product hierarchy may be shown in a tree for the interested viewer, but seldom used.

Some embodiments facilitate presenting a data object hierarchy according to various types or categories. In such embodiments, computing device 105 determines 307 a classification strategy and determines 310 the node type associated with each data object based on the determined classification strategy and/or one or more attributes of the data object. For example, computing device 105 may determine 307 the classification strategy by identifying a default classification strategy or a classification strategy previously associated with the hierarchy of data objects. In addition, or alternatively, computing device 105 may allow a user to select a classification strategy that is based on one or more attributes of the data objects in the hierarchy. Referring to FIG. 3, in such embodiments, computing device 105 determines 307 the classification strategy by receiving a selection of a classification strategy (e.g., via input interface 130).

For illustrative purposes, FIGS. 9-12 demonstrate the presentation of a hierarchy of university library holdings based on a user-selectable classification strategy. In such an example, students accessing a university library system may explore a library catalog through an interactive interface using a standard hierarchical tree.

Figure 9:
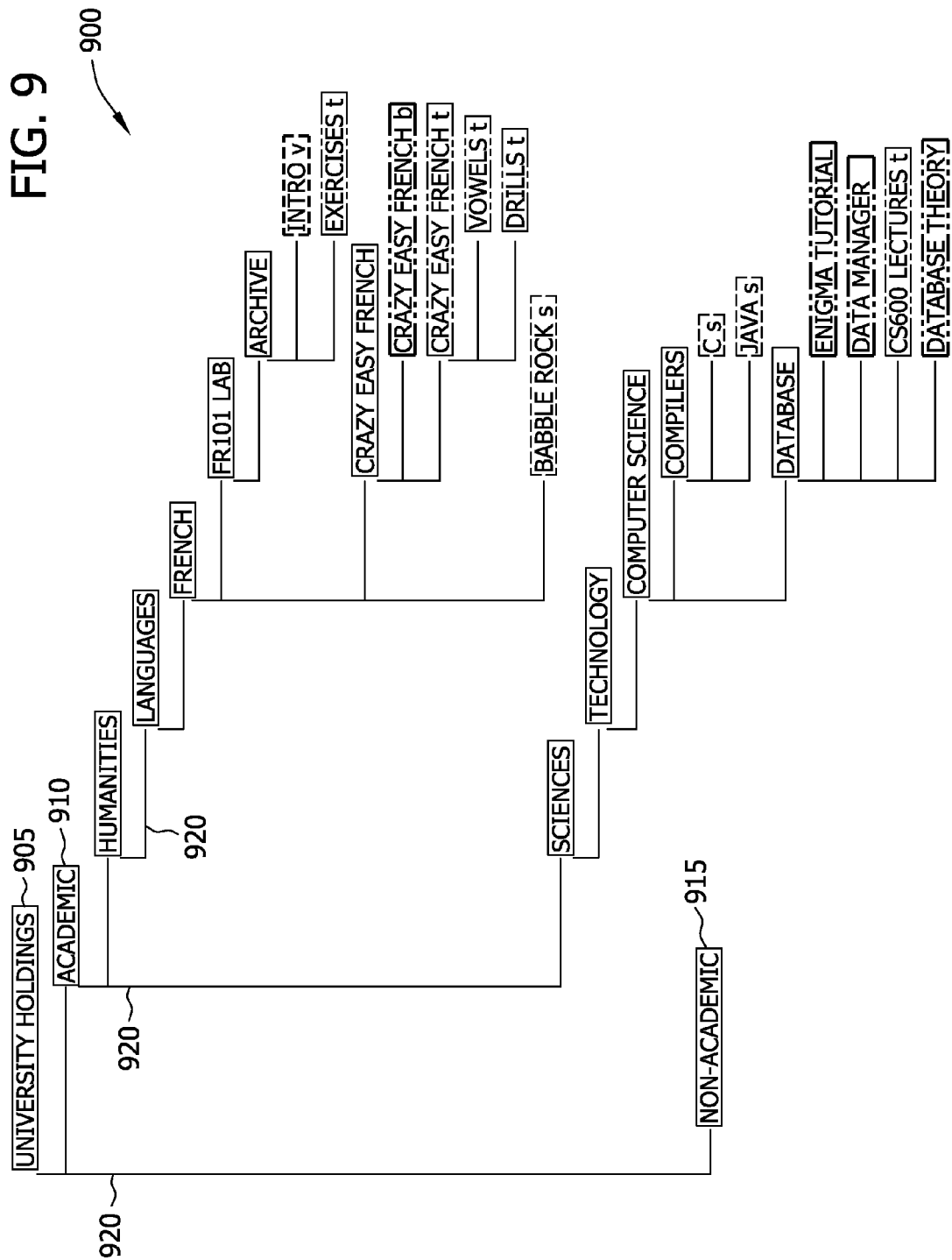
FIG. 9 is an exemplary user interface for presenting a base view of a hierarchy of university holdings.

FIG. 9 is an exemplary user interface 900 for presenting a base view of a hierarchy of university holdings. User interface 900 includes a root node 905 representing all university holdings. Root node 905 is positioned at the top left-hand corner of user interface 900, and each child node is positioned below and to the right of a corresponding parent node (e.g., in an expandable tree arrangement). For example, a first child node 910 corresponding to a node type of "academic" and a second child node 915 corresponding to a node type of "non-academic" are shown below and to the right of root node 905. First child node 910 is expanded, such that child nodes of first child node 910 are displayed.

In user interface 900, holdings are graphically distinguished from each other based on a media type: books (identified with a "b"), tapes (identified with a "t"), video (identified with a "v") and software (identified with an "s"). User interface 900 also includes hierarchical connectors 920 representing hierarchical relationships between holdings. Accordingly, user interface 900 presents holdings primarily based on hierarchical relationships and represents classification into node types (e.g., media type) using graphical distinction.

Figure 10:
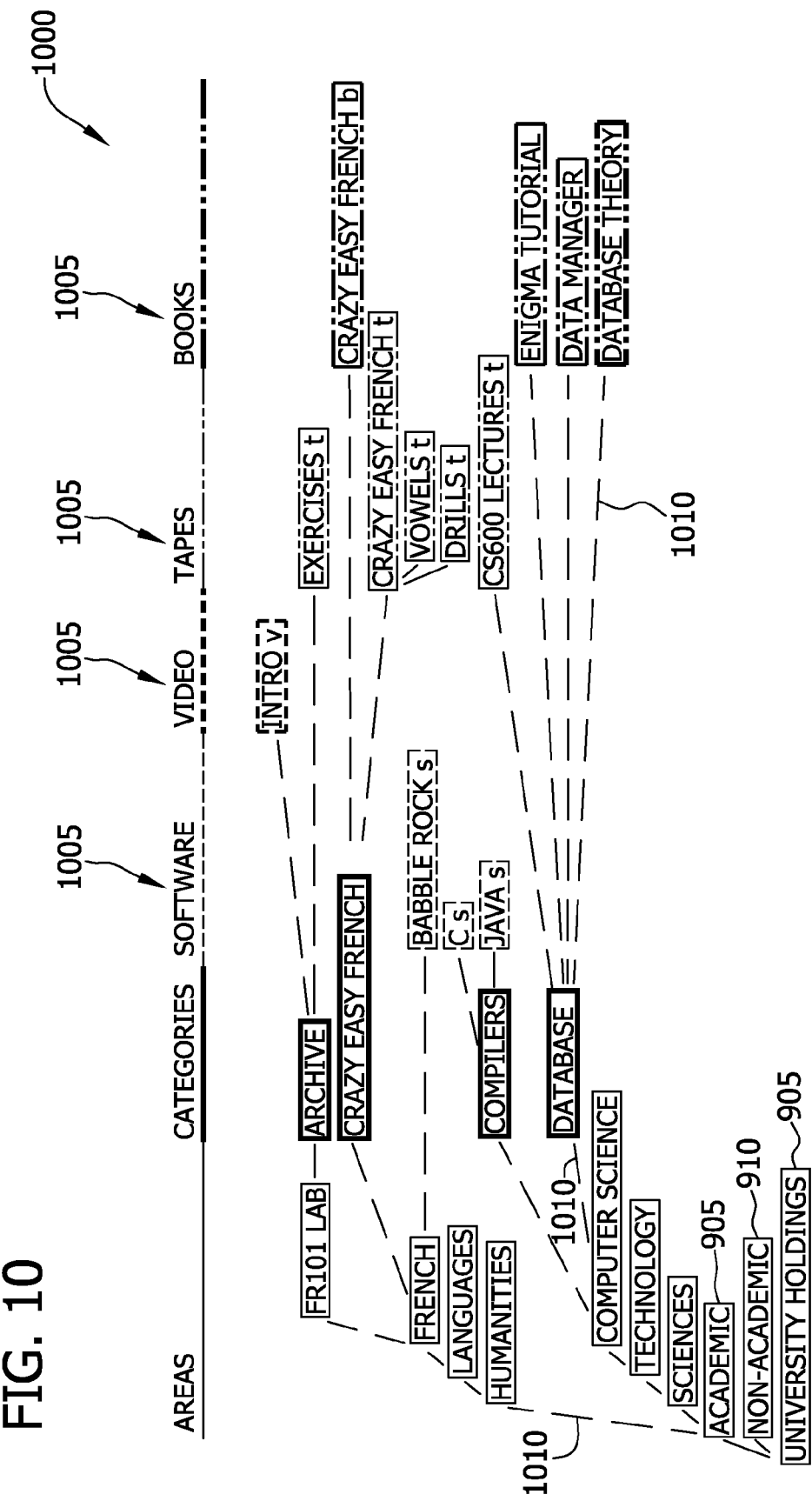
FIG. 10 is an exemplary user interface for presenting a hierarchy of university holdings as a tree stratified by media type.

FIG. 10 is an exemplary user interface 1000 for presenting a hierarchy of university holdings as a tree stratified by media type. Root node 905 is positioned at a corner (e.g., the lower left-hand corner) of user interface 1000, and child nodes (e.g., first child node 910 and second child node 915) representing objects at each successive level of the hierarchy are positioned progressively farther from the corner (e.g., above and to the right of the parent node).

In user interface 1000, the tree nodes shown in FIG. 9 are positioned in strata 1005 that are presented as vertical columns. In addition, hierarchical connectors 1010 represent the hierarchical relationships between the data objects represented by the tree nodes. Accordingly, the user is presented a simple list of books, tapes, videos and software, in a tabular format, without losing the benefit of the tree. Color or other graphical distinction that emphasizes continuity for the strata 1005 allows the user to perceive the tree nodes in each stratum 1005 as a list.

Figure 11:
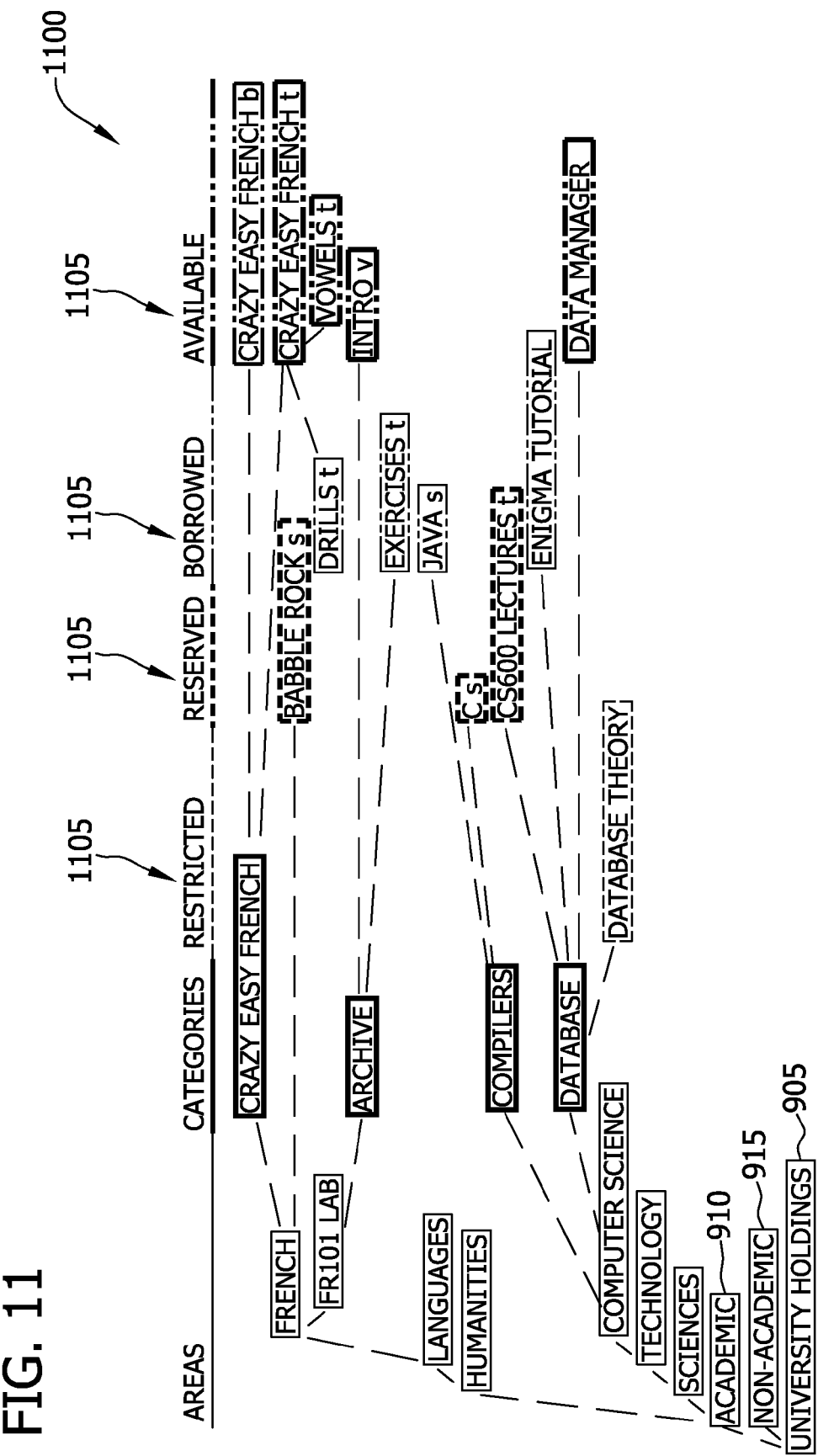
FIG. 11 is an exemplary user interface for presenting a hierarchy of university holdings as a tree stratified by availability.

FIG. 11 is an exemplary user interface 1100 for presenting a hierarchy of university holdings as a tree stratified by availability. For example, each holding may be classified as available, reserved, borrowed, or restricted, and this availability may be considered an attribute of each holding. When the user selects a classification strategy that distinguishes holdings by the availability attribute, tree nodes representing the holdings are positioned in strata 1105 associated with the various availabilities. For example, the same tree nodes that are stratified by media type in FIG. 10 may be stratified by availability.

Figure 12:
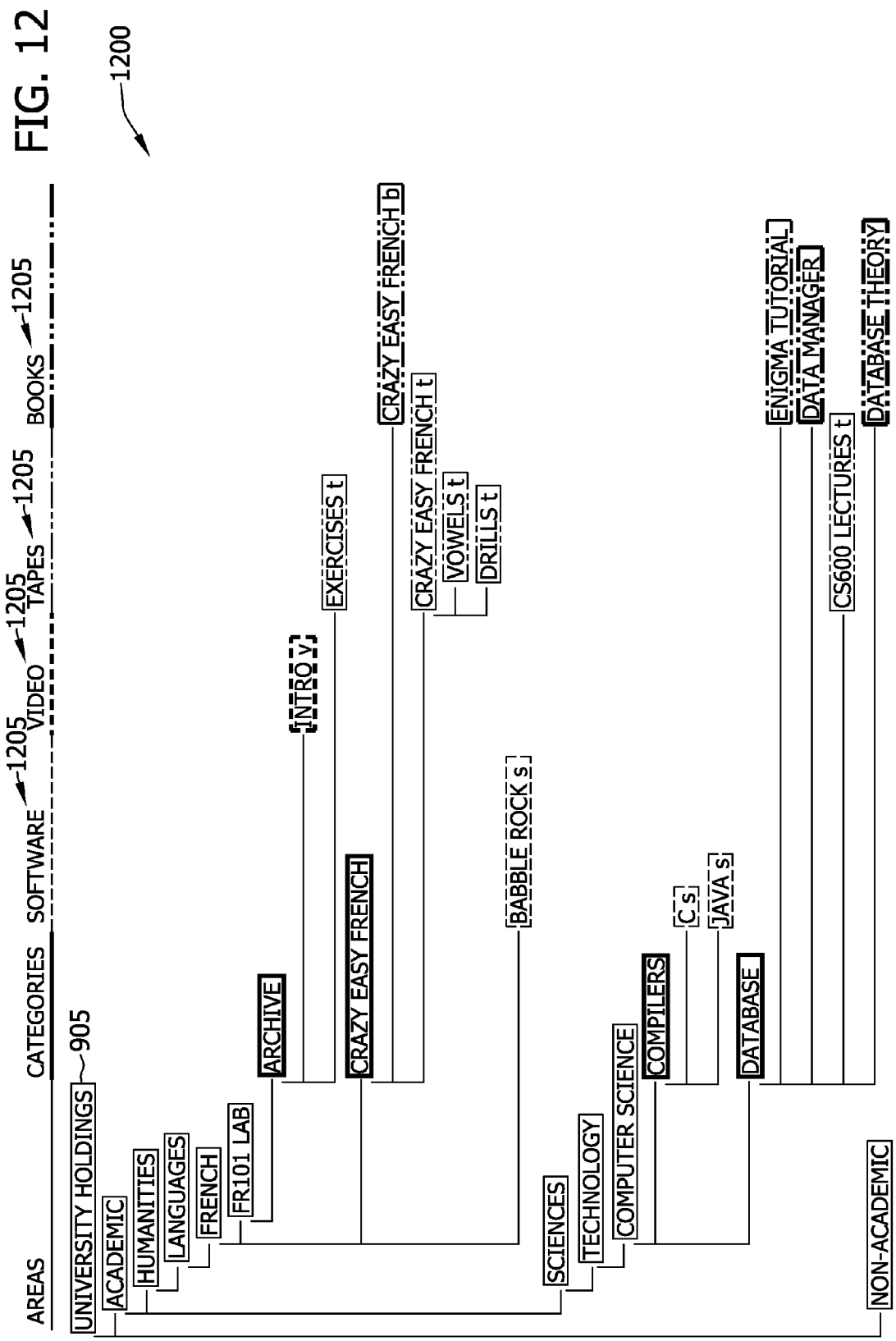
FIG. 12 is an exemplary user interface for presenting a hierarchy of university holdings as a tree stratified by media type with emphasis on a hierarchical structure.

FIG. 12 is an exemplary user interface 1200 for presenting a hierarchy of university holdings as a tree stratified by media type with emphasis on a hierarchical structure. Root node 905 is positioned at the top left-hand corner of user interface 1200, similar to the positioning of root node 905 in the base hierarchy view of user interface 900 (shown in FIG. 9). Also, as in user interface 900, each child node is positioned below and to the right of a corresponding parent node.

Unlike user interface 900, user interface 1200 includes strata 1205 associated with media types. Each tree node is positioned in a stratum 1205 based on the media type associated with the holding represented by the tree node, as in user interface 1000 (shown in FIG. 10). Accordingly, user interface 1200 emphasizes the tree structure of the hierarchy by vertically positioning tree nodes based on hierarchical relationships, while presenting attribute information by horizontally positioning the tree nodes in the various strata 1205.

Such an embodiment may reduce the visual effect of changes applied to the tree nodes. For example, the addition of a tree node may simply shift all nodes positioned below the added node by a constant amount (e.g., the height of one row in user interface 1200).

Notably, the structure of the trees shown in FIGS. 9-12 remains unchanged, despite the various presentations described. Rather, the manner in which the tree is drawn allows distinctions between nodes to be clear to the user. Further, stratification based on attributes of the nodes allows additional information to be conveyed. For example, user interface 1100 presents availability status, which is not shown in user interfaces 900, 1000, and 1200 (shown in FIGS. 9, 10, and 12, respectively).

The use of varied stratifications allows the user to view the same data in different ways, as the library catalog example shows. This may be useful for any application that could present complex data in tree form. For example, a genealogical tree could be presented showing all people grouped by state, country of origin, work sector, education, and/or religious affiliation. A personnel chart could show department management hierarchy as a tree, but show all personnel according to classes of educational degree, and/or by area of discipline. For instance, all chemical engineers might be shown distinct from all mechanical engineers, and so on. The interface to a project could allow files to be grouped in various ways without compromising the presentation of the underlying file directory tree. For instance, a set of files could be presented according to software application types, dates modified, and/or file owners.

Embodiments described above present strata in straight rows or columns. Other shapes of strata are also contemplated and may enhance the visual effect and/or interpretation of presented trees. For example, in some embodiments, strata are depicted in a curved (e.g., elliptical, circular, ovular, arced, and/or curvilinear) shape. Such embodiments facilitate drawing straight hierarchical connectors between nodes in a stratum without requiring exceptional staggering of the nodes.

The fact that a stratified tree has segments of the tree separated already (e.g., by node type) leads to the potential for projecting the strata onto desired shapes and/or images. When only one or two strata are presented, elliptical (e.g., circular) or arced strata may be presented. Elliptical or arced strata may be useful when distinguishing a selected group of nodes from unselected nodes based on an attribute of interest. For example, if the hierarchy represents the management hierarchy of a company, elliptical strata may be used to distinguish a group of managers selected for an annual productivity award from those not selected. When more than two strata are presented, the top two strata may be represented in an elliptical or arced form as well.

Figure 13:
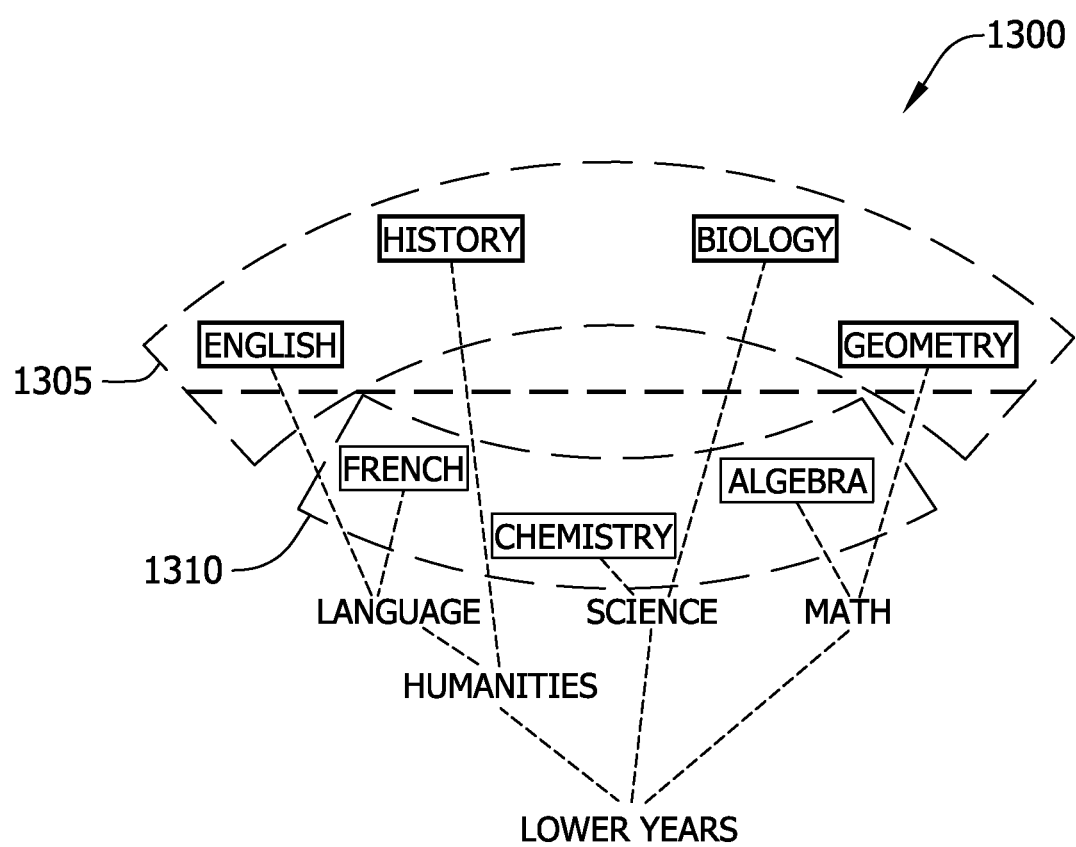
FIG. 13 is a user interface for presenting a hierarchy of education courses using arced strata.

FIG. 13 is a user interface 1300 for presenting a hierarchy of education courses using arced strata. User interface 1300 includes a first elliptical stratum 1305 associated with a "completed" status and a second elliptical stratum 1310 associated with a "not completed" status. The tree nodes in first elliptical stratum 1305 represent courses that have been completed by a student, and the tree nodes in second elliptical stratum 1310 represent courses that have not been completed by a student.

In addition to aesthetic appeal, the use of arced strata presents all of the nodes in each stratum as equally significant (e.g., the order of learning is not significant, but all of the courses are equally important). When the student completes a course, user interface 1300 may position the corresponding tree node in first elliptical stratum 1305, optionally graphically distinguishing completed courses displayed in first elliptical stratum 1305 from uncompleted courses displayed in second elliptical stratum 1310. Accordingly, when all courses are completed, all the tree nodes representing the courses may be included in first elliptical stratum 1305.

In some embodiments, the shape of one or more strata is conformed to a desired shape or image. For example, strata may be drawn in complex curves, including logos and other pictures, as long as a user (e.g., an interface designer) or an automated process specifies the path and/or the boundaries of each stratum.

Allowing curved lines between the nodes may allow segments that do not run the full length of the image. In effect, nodes in one or more portions of a strata could be positioned where they are desired (e.g., according to a desired spatial distribution specified by a default setting and/or by a user), and the hierarchical connectors extending from the nodes may include one or more vertices and/or be extended in curves to connect the endpoint nodes without intersecting other nodes and/or other hierarchical connectors.

Figure 14:
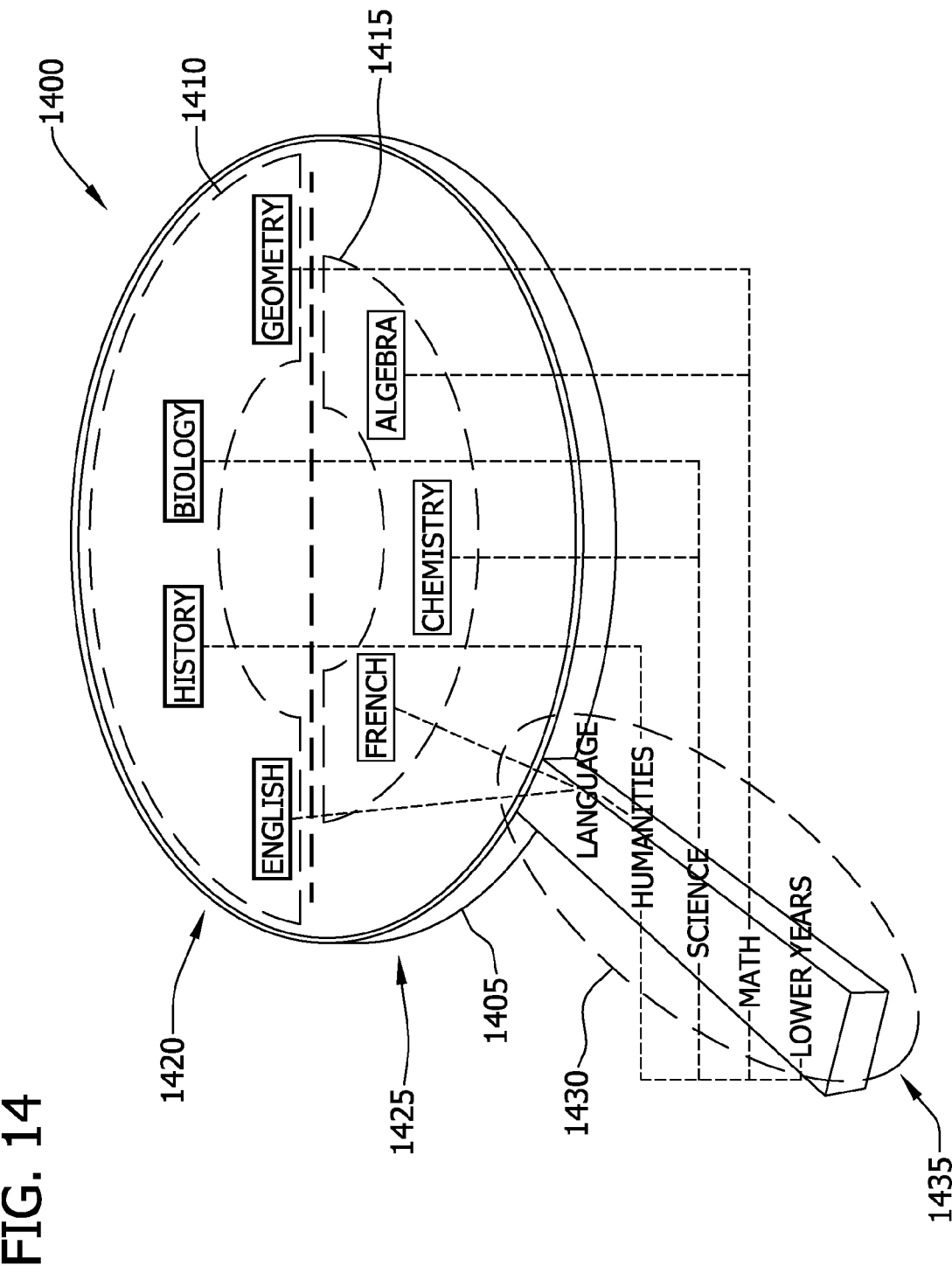
FIG. 14 is an exemplary user interface for presenting a hierarchy of education courses using strata conformed to the shape of an image.

FIG. 14 is an exemplary user interface 1400 for presenting a hierarchy of education courses using strata conformed to the shape of an image. User interface 1400 includes a logo 1405 in the form of a magnifying glass. A first stratum 1410 and a second stratum 1415 are defined as being coextensive with at least a portion of logo 1405. For example, first stratum 1410 is allocated an area in the top portion 1420 of logo 1405, and second stratum 1415 is allocated an area in the bottom portion 1425 of logo 1405.

Further, a parent node area 1430 is defined coextensive with a handle portion 1435 of logo 1405. Tree nodes with child nodes in first stratum 1410 and/or second stratum 1415 are positioned in parent node area 1430. In exemplary embodiments, areas allocated to first stratum 1410, second stratum 1415, and parent node area 1430 are received from a user.

Graphical representations as described herein may be drawn using various drawing algorithms, which may be iterative or recursive. For simplicity of terminology, the exemplary implementation described below assumes that the strata are drawn vertically. However, the implementation may be applied to strata drawn horizontally, diagonally, and/or in any orientation.

An exemplary positioning algorithm capitalizes on the fact that sub-trees connect to the rest of a tree only through their root. For example such an algorithm may determine the position for each tree node representing a data object in a sub-hierarchy of the hierarchy to create a sub-tree, and after creating the sub-tree, determine the positions of tree nodes representing data objects above the sub-hierarchy in the hierarchy. Further, the positions of the tree nodes representing data objects above the sub-hierarchy may be determined at least in part by determining positions at which hierarchical connectors extending from the tree nodes will not intersect the sub-tree.

Figure 15:
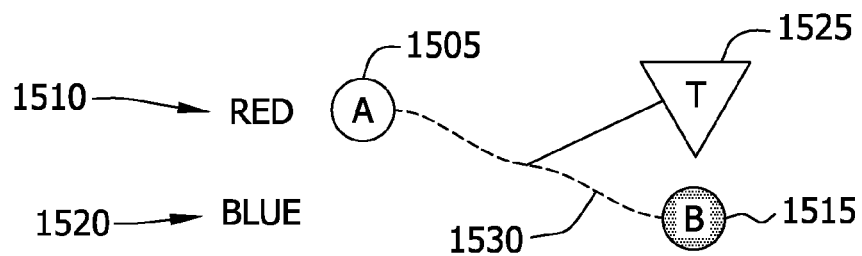
FIG. 15 is an illustration of a first node in a first stratum, a second node in a second stratum, and a sub-tree T.

FIG. 15 is an illustration of a first node 1505 in a first (or "red") stratum 1510, a second node 1515 in a second (or "blue") stratum 1520, and a sub-tree T 1525. Any sub-tree T 1525 whose root node is on a path 1530 between first node 1505 and second node 1515 will not have hierarchical connectors to any node that is not on path 1530. Therefore, first node 1505 and second node 1515 can always be placed in first stratum 1510 and second stratum 1520 in the drawing.

Figure 16:
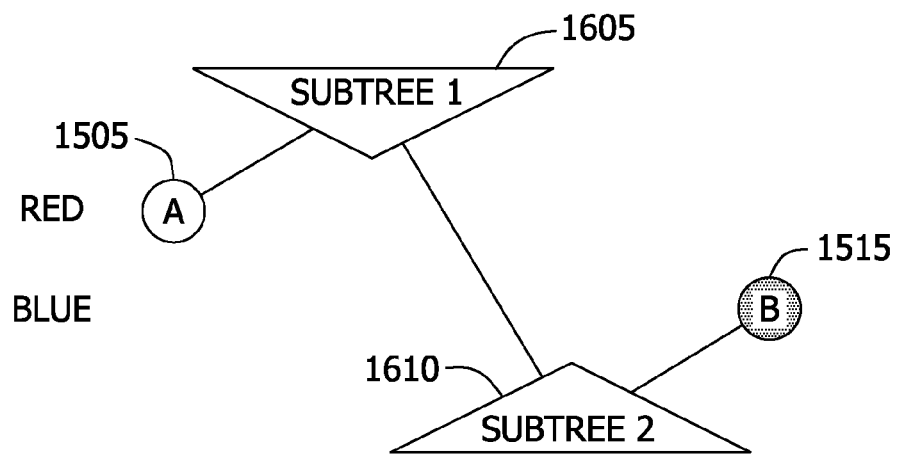
FIG. 16 is an illustration of a first sub-tree and a second sub-tree positioned between the first node and second node shown in FIG. 15.

This placement is possible even though the horizontal distance between first node 1505 and second node 1515 may need to be increased to allow for any sub-tree T 1525 rooted on path 1530, as shown in FIG. 16, an illustration of a first sub-tree 1605 and a second sub-tree 1610 positioned between first node 1505 and second node 1515. There is no concern that any sub-tree will contain a hierarchical connector to some node in the rest of the tree, resulting in a need for edges to intersect or cross over one another in the drawing. Exemplary positioning algorithms need not pursue such steps explicitly (and in fact moving all of the nodes before all of the nodes have been ordered in the rows may not be the most efficient approach); rather, they may take advantage of this quality of trees.

Exemplary embodiments capitalize on this fact (that a sub-tree T only connects to the rest of the tree through the root of T) using a depth-first traversal of the tree, calculating positions in the drawing for each node as the node is first visited. A depth-first traversal is itself of linear growth, and has the advantage that once a sub-tree T is drawn, no further hierarchical connectors will extend to any of its child nodes. Therefore, hierarchical connectors may be drawn around the portion of the drawing allocated to a certain sub-tree T without concern that future hierarchical connectors will intersect them.

Figure 17:
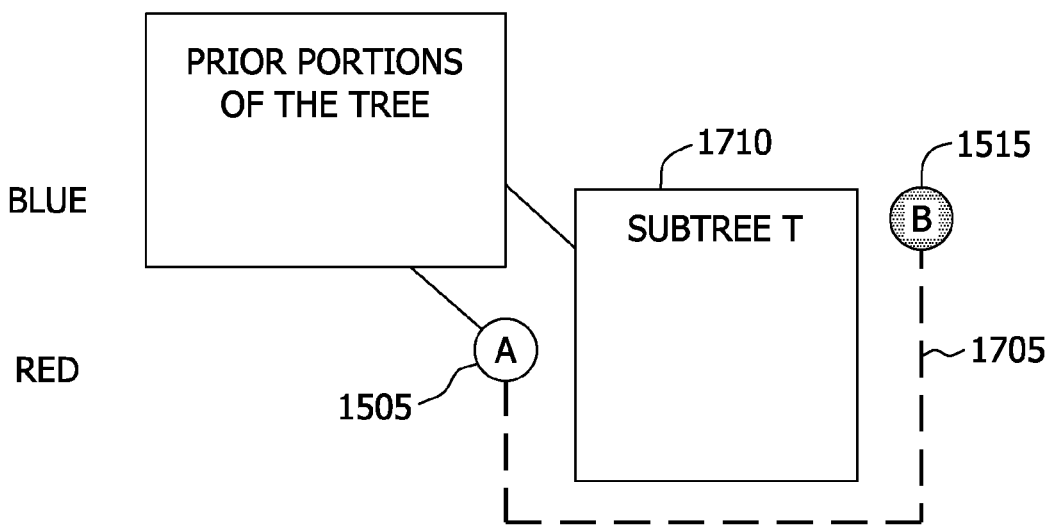
FIG. 17 is an illustration of a hierarchical connector being drawn between the first node and second node shown in FIG. 15.

FIG. 17 is an illustration of a hierarchical connector 1705 being drawn between first node 1505 and second node 1515. As shown in FIG. 17, in a depth-first traversal of a data object hierarchy, a sub-tree 1710 has already been drawn or had an area allocated to it. Now the traversal is visiting second node 1515, whose parent is first node 1505. Hierarchical connector 1705 extending between first node 1505 and second node 1515 may be drawn around the area allocated to sub-tree 1710 because no subsequently drawn hierarchical connector will extend to any of the nodes in sub-tree 1710.

As described herein, a depth-first traversal does not necessarily refer to a depth-first traversal of the original data object hierarchy. Rather, the traversal begins with any node in the hierarchy, which could be called the drawing root node, as opposed to the actual root node. For example, in user interface 400 (shown in FIG. 4), root node 410, labeled "A", is the root node shown and is the actual root of the presented hierarchy. The trees shown in FIGS. 5-8 are drawn using the node labeled "H" as the drawing root node, even though root node 410 remains the root node of the underlying data object hierarchy.

In exemplary embodiments, the traversal from the drawing root node treats all hierarchical connectors the same way, regardless of which node for a hierarchical connector is the parent node in the actual data object hierarchy. For example, the node labeled "D" may be a child of the node labeled "H" in such traversals, even though in the actual hierarchy, H is a child of D.

In some embodiments, every tree node is placed in a unique column. Hierarchical connectors, which are also referred to as "edges" below, are drawn indirectly, looping downward through the tree. Each hierarchical connector is represented by two vertical line segments connected by a horizontal line segment.

The drawing algorithm may be presented with nodes of uniform size. Alternatively, arrays may be maintained with column widths and starting points and/or row heights and starting points. In exemplary embodiments, the drawing algorithm runs in linear time by obviating the need to check for intersecting hierarchical connectors.

Figure 18:
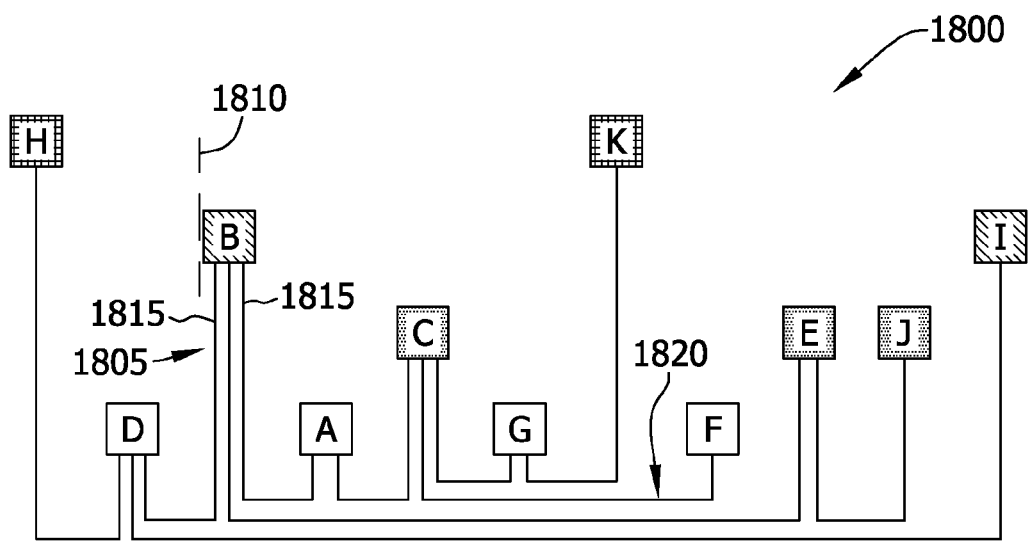
FIG. 18 is a user interface including hierarchical connectors drawn by a first exemplary drawing algorithm.

FIG. 18 is a user interface 1800 including hierarchical connectors drawn by a first exemplary drawing algorithm. For example, user interface 1800 may be created at least in part by executing the algorithm shown in Listing 1 below.

LISTING 1

```
CreateDrawingTree ( )
DRAWINGROOTNODE.edgeDistanceFromBottom ← 0
column ← 0
push DRAWINGROOTNODE
do while stack is not empty {
    current ← pop
    /* draw current */
    column++
    current.left ← column * COLUMN_WIDTH
    current.top ← current.level * ROW_HEIGHT
    draw( current , current.left , current.top )
    if current ≠ DRAWINGROOTNODE then {
        /* draw edge */
        current.edgeDistanceFromBottom ←
            current.parent.edgeDistanceFromBottom − 1
            + current.parent.numberOfChildren
            − current.parent.childrenEdgesDrawn
        drawedge ( current )
        current.parent.childrenEdgesDrawn++
    }
    /* children of current */
    current.childrenEdgesDrawn ← 0
    for each child in current.children {
        child.parent ← current
        push child
    }
}
```

In user interface 1800, the x-coordinate of each of the vertical line segments 1805 is calculated by offset from the left edge 1810 of the node in question based upon the total number of hierarchical connectors 1815 for that node. The y-coordinate of the horizontal segments 1820 is calculated by offset from the x-axis (node field edgeDistanceFromBottom) based upon edgeDistanceFromBottom for the parent and for the number of children remaining to be drawn for the parent.

Figure 19:
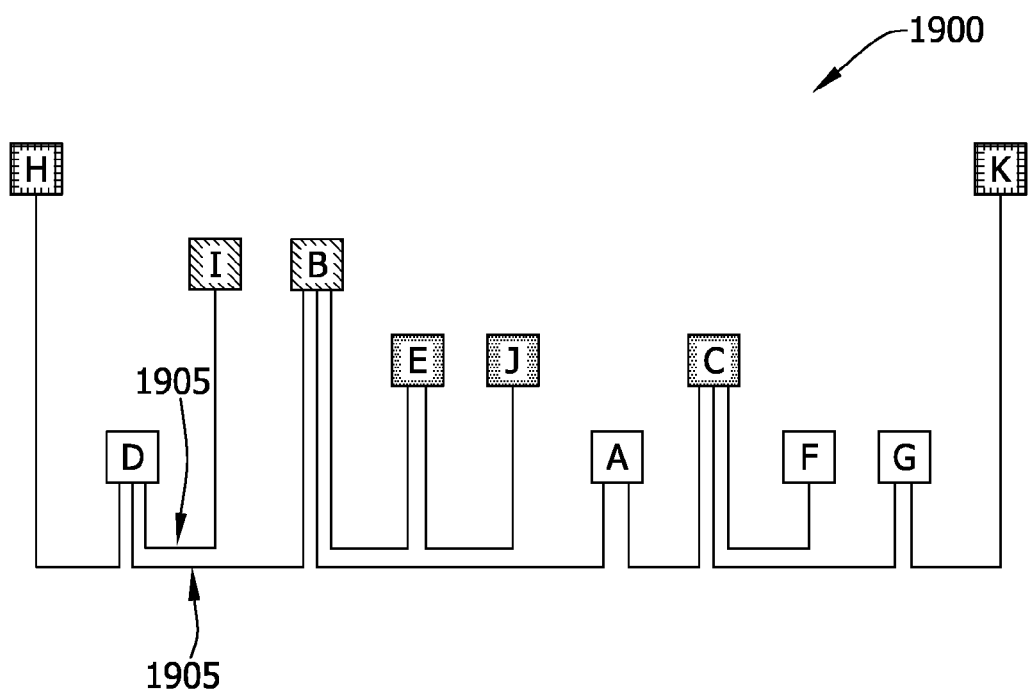
FIG. 19 is a user interface including hierarchical connectors drawn by a second exemplary drawing algorithm.

FIG. 19 is a user interface 1900 including hierarchical connectors drawn by a second exemplary drawing algorithm. For example, user interface 1900 may be created at least in part by executing the algorithm shown in Listing 2 below.

Listing 2

```
CreateDrawingTree ( )
SetNumberofDescendants( ) // unique to second alg.
DRAWINGROOTNODE.edgeDistanceFromBottom ← 0
column ← 0
push DRAWINGROOTNODE
do while stack is not empty {
    current ← pop
    /* draw current */
    column++
    current.left ← column * COLUMN_WIDTH
    current.top ← current.level * ROW_HEIGHT
    draw( current , current.left , current.top )
    if current ≠ DRAWINGROOTNODE then {
        /* draw edge */
        current.edgeDistanceFromBottom ←
            current.parent.edgeDistanceFromBottom − 1
            + current.parent.numberOfChildren
            − current.parent.childrenEdgesDrawn
        drawedge ( current )
        current.parent.childrenEdgesDrawn++
    }
    /* children of current */
    current.childrenEdgesDrawn ← 0
    currentChildren = sortAscending(current,children on
        numberOfDescendents) // unique to second alg.
    for each child in current.children {
        child.parent ← current
        push child
    }
}
```

The algorithm shown in Listing 2 is similar to that shown in Listing 1. Modified or added lines are emphasized with comments indicating that the line is unique to the second algorithm.

Notably, the second exemplary drawing algorithm, sorts children of the current node by the number of their descendents in the drawn tree and pushes the children onto the stack in decreasing order. Such an embodiment facilitates ensuring that children with fewer descendents are drawn closer to parents than their siblings, potentially resulting in the hierarchical connectors being easier to follow visually. The algorithm shown in Listing 1 may be expected to execute in $O(n)$ time. The algorithm shown in Listing 2 may be expected to execute in $O(n*\log(n))$ time. Accordingly, one or the other algorithm may be selected based on the desired appearance of the tree and/or the desired performance of the positioning algorithm for a given tree size.

As shown in FIG. 19, user interface 1900 includes less stacking of horizontal segments 1905 when compared with user interface 1800 (shown in FIG. 18). Such an algorithm may be useful in contexts such as a stratified tree of only one level, such as a generated menu. For example, if the user hovers over a menu item, the contents of the menu could be horizontally expanded as a menu bar directly beneath the main menu bar. Further, such an algorithm may be valuable in an application that is limited to presenting each node in a separate column or row, such as an application that presents folders in a hierarchy and allows the user to see a list of files beneath every opened folder, and/or a visual database, such as a photo collection or personnel directory, that shows an image or other photo on each row with a clear path showing how each item is classified. In addition, such an algorithm may be used in a context involving user interaction in which simple representation (e.g., less than ten items) that updates quickly is desired. For instance, a user might select users from a small group of users on a local network to join in a video phone conference.

Some embodiments enable truncation of one or more branches of a tree. For example, a graphical representation of a hierarchy may present a selected portion of the hierarchy, such as a list of favorite files. In such a scenario, the graphical representation may include only the selected nodes and the set of nodes (e.g., directly related and/or interconnecting nodes) needed to connect them to one another using hierarchical connectors, or alternatively to connect them to the root of the hierarchy. In the case of such truncation, a user may be permitted to click on any node to add its adjacent nodes to the tree, so that the user could traverse the tree to select new nodes.

Exemplary Operating Environment

Operations described herein may be performed by a computer or computing device. A computer or computing device includes one or more processors or processing units and at least one memory device, such as a system memory and/or some form of computer-readable media. By way of example and not limitation, computer-readable media comprise computer storage media and communication media. Computer storage media are non-transitory and include volatile and nonvolatile, removable and non-removable media implemented in any method or technology for storage of information such as computer-readable instructions, data structures, program modules or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

In exemplary embodiments, any portion or the entirety of the operations described herein are encoded as computer-executable instructions, which are embodied on one or more non-transitory computer-readable media. When executed by at least one processor, the computer-executable instructions cause the processor to perform the encoded operations.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for visually presenting, simultaneously in the same graphical representation, both hierarchical relationships among, and non-hierarchical type information for, a plurality of data objects, the method comprising:
    determining for each data object an associated node type, thereby populating a plurality of node types, each node type corresponding to a single non-hierarchical type;
    creating a tree node for each data object, each tree node identifying the node type of the associated data object; and
    visually presenting in the graphical representation the tree nodes organized into a set of visually recognizable and distinguishable strata, each stratum encompassing a distinct region in the graphical representation corresponding to a single node type irrespective of a node's hierarchical position, said graphical representation presenting the hierarchical relationships among the tree nodes; wherein;
    in the graphical representation, a plurality of hierarchical connectors extend between tree node pairs;
    the hierarchical connectors represent hierarchical relationships between the data objects represented by the tree node pairs; and
    the graphical representation includes a boundary perpendicular to an axis along which at least some of the strata are arranged; said method further comprising:
    determining a target position associated with each depicted tree node, wherein the target position takes into account a pre-selected distance from the boundary, such that hierarchical connectors extending from the depicted tree node do not intersect any tree node not directly related to the depicted tree node and do not intersect any other hierarchical connector; and
    positioning each depicted tree node at its associated target position.

2. One or more non-transitory computer-readable media having computer-executable instructions embodied thereon, wherein when executed by at least one processor, the computer-executable instructions cause the processor to:
    determine a non-hierarchical node type associated with each data object in a hierarchy of data objects, thereby populating a plurality of node types;
    create a graphical representation of the hierarchy, including a plurality of visually identifiable and distinguishable strata corresponding to the plurality of node types, while simultaneously preserving and visually displaying on the same graphical representation hierarchical relationships among the data objects, said graphical representation comprising:
    a plurality of tree nodes representing the data objects, each tree node representing one data object and visually identifying the node type corresponding to the associated data Object;
    a plurality of strata visually displaying the tree nodes organized by node type, each stratum encompassing a distinct region on the graphical representation corresponding to a single node type irrespective of a node's hierarchical position; and
    a plurality of hierarchical connectors extending between pairs of tree nodes, wherein the hierarchical connectors represent hierarchical relationships between the data objects represented by the tree node pairs;
    wherein the graphical representation includes a boundary perpendicular to at least a portion of an axis along which at least some of the strata are arranged, and the computer executable instructions further cause the processor to:
    determine a target position associated with each depicted tree node, wherein the target position includes a distance from the boundary at which hierarchical connectors extending from the depicted tree node do not intersect any tree node not directly related to the depicted tree node and do not intersect any other hierarchical connector; and
    position each depicted tree node at its associated target position.

* * * * *